June 3, 1952 M. J. E. GOLAY 2,598,683
CORRECTED DELAY LINE
Filed Feb. 5, 1946 4 Sheets-Sheet 1

FIG. 3-A

INVENTOR.
MARCEL J.E. GOLAY
BY William D. Hall
ATTORNEY

June 3, 1952 M. J. E. GOLAY 2,598,683

CORRECTED DELAY LINE

Filed Feb. 5, 1946 4 Sheets-Sheet 2

FIG. 4-A

*INVENTOR.*
MARCEL J.E. GOLAY
*BY* William D. Hall
ATTORNEY

*INVENTOR.*
MARCEL J. E. GOLAY
*BY* William D. Hall
ATTORNEY

June 3, 1952 M. J. E. GOLAY 2,598,683

CORRECTED DELAY LINE

Filed Feb. 5, 1946 4 Sheets-Sheet 4

INVENTOR.
MARCEL J. E. GOLAY

BY William D. Hall

ATTORNEY

Patented June 3, 1952 2,598,683

UNITED STATES PATENT OFFICE 2,598,683

CORRECTED DELAY LINE

Marcel J. E. Golay, Long Branch, N. J.

Application February 5, 1946, Serial No. 645,679

43 Claims. (Cl. 178—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical networks, their application to communication systems, and more particularly to low pass filters in the form of dispersionless delay lines which may be used, for example, as low pass filters with substantially no attenuation up to cut-off or as a source of variously delayed signals for controlling the operation of communication systems, such as those shown in divisional application Serial No. 751,941, filed June 2, 1947, entitled "Multiplex Pulse Communication System," now Patent No. 2,567,203, September 11, 1951.

It is an object of this invention to provide dispersionless delay lines having substantially linear frequency phase characteristic from zero frequency up to the cut-off frequency.

An additional object of this invention is to provide delay networks with substantially linear frequency phase characteristics, the networks having the form of T or "ladder" type delay lines with additional phase-correcting elements, and having a plurality of junction points suitable for deriving a corresponding plurality of variously delayed but otherwise identical signals.

It is an additional object of this invention to provide a low pass filter having no attenuation up to the cut-off frequency, a linear frequency phase characteristic up to the cut-off frequency, very sharp cut-off characteristic, and a high attenuation beyond the cut-off frequency.

Yet another object of this invention is to provide several methods of terminating the corrected delay lines so as to render their termination reflectionless or cause them to reflect without or with phase reversal of the reflected signals.

Still another object of this invention is to provide a method of energizing the phase-corrected delay lines.

It is known in the art of electrical networks that an ideal delay line may be defined as an ideal low pass filter having linear frequency phase characteristics, no attenuation up to the cut-off frequency, and infinite attenuation beyond the cut-off frequency. It is also well known in the art of the electrical networks that the ideal low pass filters may be only approximated in actual practice, numerous attempts and theories having been developed in the past for approaching this ideal with actual networks. The invention discloses novel modifications of the delay lines which approach this ideal more closely than the networks known to the prior art.

The invention discloses the solution of the aforementioned problem in connection with the delay line type of network having "ladder" configuration. This type of network offers the advantage, over other types of delay networks, of having a multiplicity of junction points which may be utilized for obtaining variously delayed, but otherwise identical, signals for controlling other electrical circuits.

The original, basic delay line was composed of a series of equal T networks, this series combining to give the overall ladder-type three-terminal configuration. This arrangement offers good frequency cut-off characteristics but poor frequency phase characteristics. A notable improvement in the frequency phase characteristics of delay lines was contributed by Prof. G. W. Pierce ("Artificial Electric Lines With Mutual Inductance Between Adjacent Series Elements" in Proceedings of American Academy of Arts and Sciences, volume 57, pages 195–212, 1921–22), who discovered that a certain amount of negative (aiding) inductance between adjacent sections—unavoidable when the coils are coaxially mounted to obtain a simple construction—is actually beneficial.

It has been discovered by me through a more complete theoretical analysis of the delay lines, and subsequent experimental verification, that delay lines having superior linear phase characteristics may be obtained if one provides certain amounts of additional, corrective mutual inductance not only between the adjacent sections but also between alternate and more distant sections; the derived equations enable one to determine the required parameters for the corrected delay lines, and when the lines are constructed having the parameters indicated by the equations, and in accordance with the discovered principles, they possess substantially linear frequency phase characteristics to a much greater extent than the best approximations heretofore known to the art. In the course of the investigation of this problem, it has been discovered that the delay lines utilizing coaxial disposition of coils, with the coils spaced from each other but having a common axis, or with the coils superimposed upon each other, have the wrong sign for the mutual inductance between alternate sections of the line when the coils are connected so as to produce the mutual inductance of the desired sign between the adjacent coils. As will be pointed out in detail in connection with the description of the specific embodiments of the invention, the presence of the mutual inductance of the wrong sign between the alternate sections can be circumvented either by providing small additional corrective coils included in the series circuit of each of the main coils and coupled to the neighboring main coils so as to produce the mutual inductance of the correct sign and magnitude between the alternate and a few of the more distant junctions, in addition to the mutual inductance of the correct sign and magnitude between adjacent sections, which is taken care of by proper spacing and wiring.

The invention thus discloses several types of delay lines with substantially linear phase characteristics, these lines having been constructed so as to make their parameters conform with the parameters derived from the equations which were obtained by taking into consideration the self-inductances of the various sections, the mutual inductances between adjacent, alternate and more distant sections, the capacities to ground, and the capacities between adjacent, alternate, and more distant junctions.

This invention also discloses various methods of terminating the corrected delay lines so as to render their termination reflectionless, or to cause it to reflect without or with phase reversal, as well as methods of energizing them.

These and other features of the invention will be more clearly understood from the following detailed description and the accompanying drawings in which.

Figure 3:
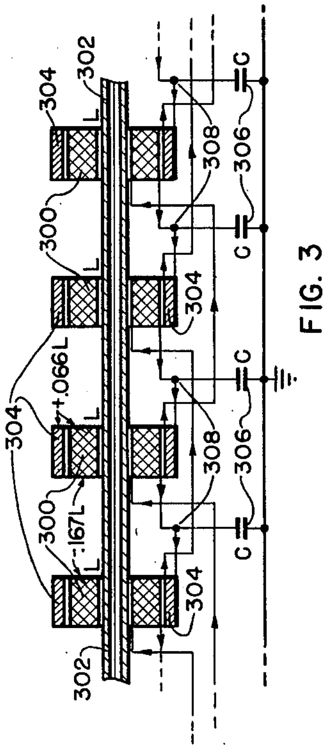
Figure 5:
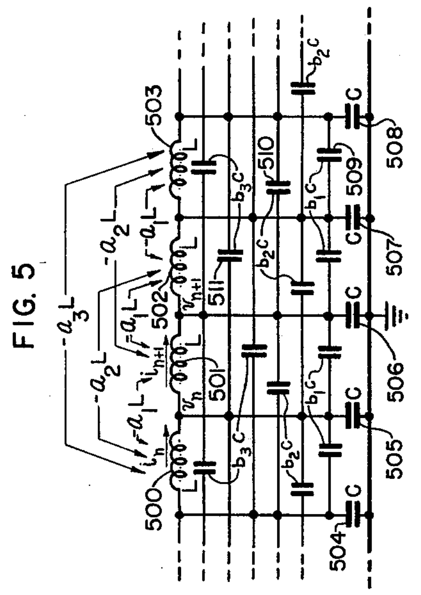
Figure 7:
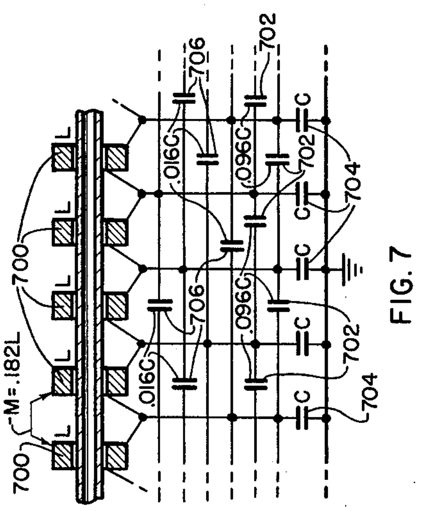
Figure 4:
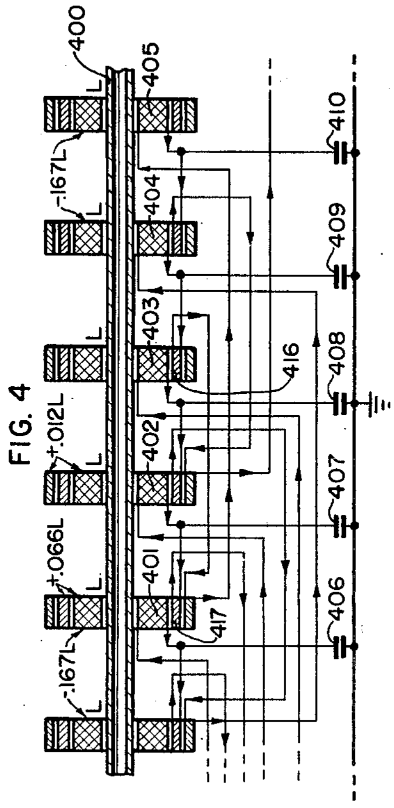
Figure 6:
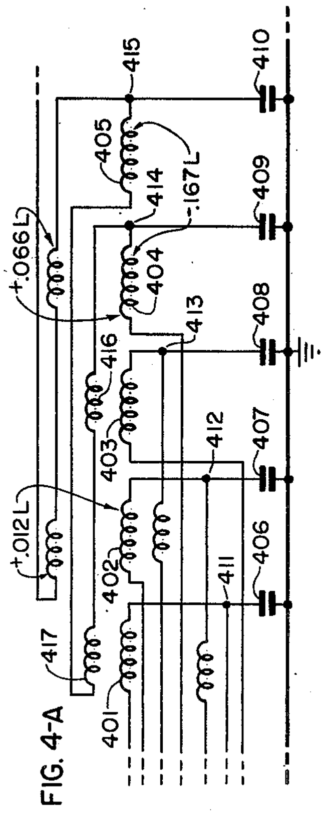
Figure 6:
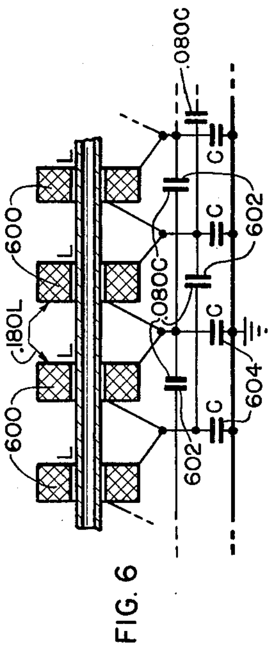
Figure 8:
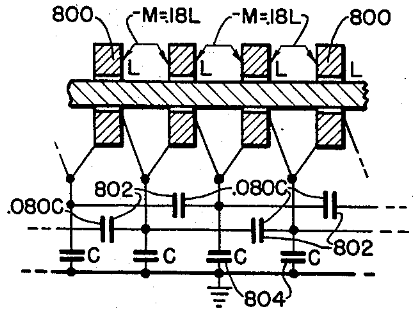
Figure 9:
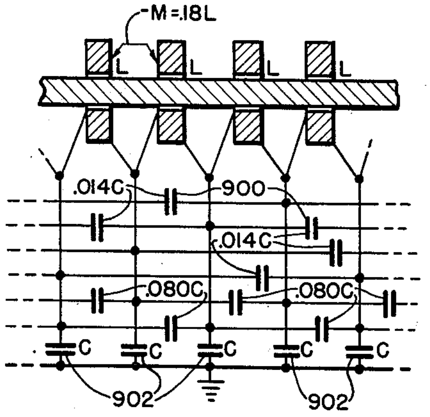
Figure 10:
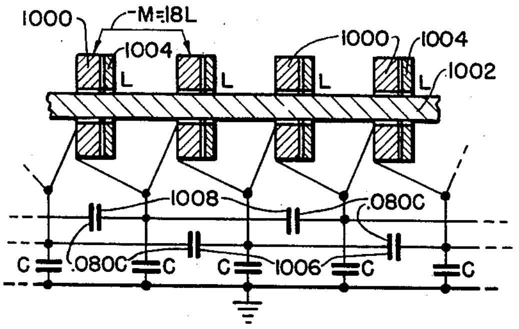
Figure 11:
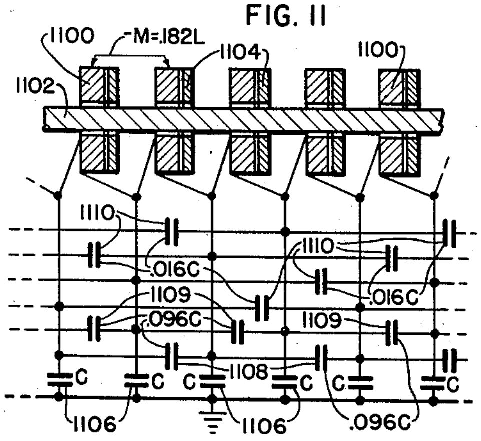
Figure 14:
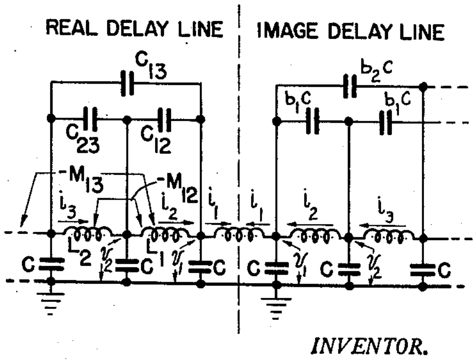
Figure 15:
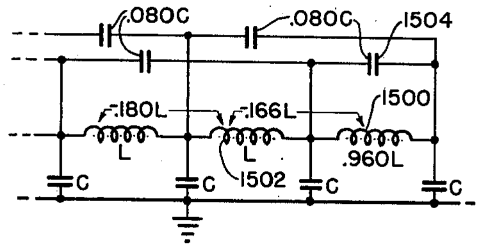
Figure 18:
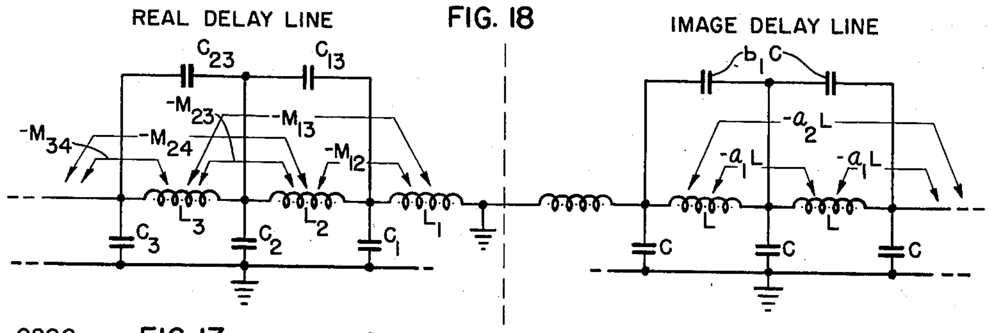
Figure 19:
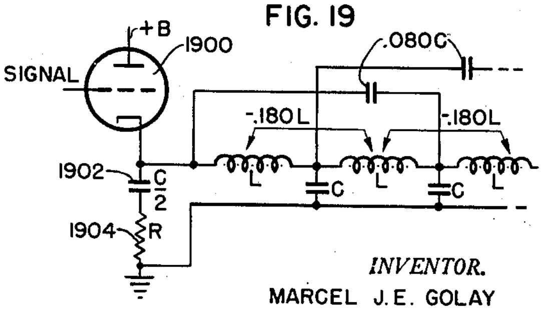
Figure 20:
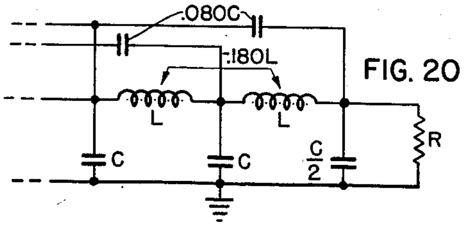

Figures 3 and 3–A are wiring and schematic diagrams respectively of a delay line with the coils coaxially mounted and in which the phase correcting elements are serially-connected inductive reactances inductively coupled to the respective adjacent, main line-coils;

Figures 4 and 4–A are wiring and schematic diagrams respectively of a modified delay line with the coils coaxially mounted, and in which the phase-correcting elements are a plurality of serially-connected inductive reactances;

Figure 5 is a schematic diagram referred to in the derivation of the extended basic theory of dispersionless delay lines;

Figure 6 is a diagram of a delay line in which the phase-correcting elements are condensers connected between alternate junction points;

Figure 7 is a diagram of a delay line in which the phase-correcting elements are condensers connected between every alternate junction point of the line, and additional condensers connected between every fourth junction point of the line;

Figures 8 and 9 are wiring diagrams of two delay lines in which the phase-corrective elements correspond to those of Figs. 6 and 7, respectively, but the coils are coaxially mounted on a common magnetic core;

Figures 10 and 11 are wiring diagrams of two delay lines similar to those in Figs. 8 and 9 respectively except that the line coils are partially magnetically shielded from each other by means of magnetic shields;

Figures 12, 13, 16 and 17 are schematic diagrams of two types of delay line terminations with in-phase reflection;

Figures 14, 15 and 18 are schematic diagrams illustrating two types of delay line terminations with 180° out-of-phase reflection;

Figure 19 is a schematic diagram for one type of line feeding;

Figure 20 is a schematic diagram for one type of reflectionless termination of a phase corrected line.

*Basic theoretical analysis of delay line*

Figure 1:
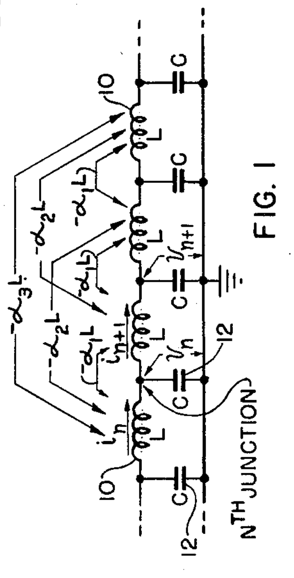
Figure 1 is a schematic diagram referred to in the basic theory of the dispersionless delay lines.

For a simplified basic theory of the ideal delay line, one needs to consider only a repeating pattern of series inductances, L being the self-inductance of any line coil, L, with mutual inductances $M_1$, $M_2$, etc., being equal to $-\alpha_1 L$, $-\alpha_2 L$, etc., between respectively adjacent, alternate, and more distant sections, and capacities C to ground, as illustrated in Fig. 1. The illustrated line includes serially connected inductance coils 10 and grounded, shunting condensers 12, the line thus representing a three-terminal, ladder-type, network. The self-inductance of the coils are indicated by L, the capacitances of the condensers by C, the mutual inductances by −L with proper subscripts, the currents in the respective sections of the line by $i_n$, $i_{n+1}$, etc., and the voltages between the respective junction points and ground by $v_n$, $v_{n+1}$, etc. The inductances and capacities are assumed to have infinite Q and zero power factor respectively. The mutual inductances are considered to be positive when the two fluxes are opposing each other, and negative when they are aiding. Kirchhoff equations for the $n$th junction and the $(n+1)$th branch can then be written as follows:

$$i_n - i_{n+1} = j\omega C v_n \qquad (1)$$

$$v_n - v_{n+1} = j\omega L[i_{n+1} + \alpha_1(i_n + i_{n+2}) + \alpha_2(i_{n-1} + i_{n+3}) + \ldots] \qquad (2)$$

where $\alpha_n$=coefficient of mutual inductance, the mutual inductance $M_n$ being equal to $-\alpha_n L$, where L is the self-inductance of any line coil, $i_n$=current in the $n$th inductance, $i_{n+1}$=current in the $(n+1)$ inductance, $j=\sqrt{-1}$, $\omega=2\pi f$, $f$ being the frequency of the currents and voltages, $v_n$=voltage across the $n$th condenser connected between the junction point of the $n$th and the $(n+1)$ inductances and ground, $v_{n+1}$=voltage across the $(n+1)$ condenser connected between the junction point of the $(n+1)$ and $(n+2)$ inductances and ground.

The recurrent or repeating pattern of the network permits us to write, generally, $$\frac{v_n}{v_{n+1}} = \frac{i_n}{i_{n+1}} = \frac{i_{n+1}}{i_{n+2}} = \frac{i_{n+2}}{i_{n+3}} = \text{etc} \ldots = e^{j\varphi} \qquad (3)$$

where $\varphi$ designates the change of phase, measured in radians, between the current and the voltage of any two adjacent sections, $e$ is the base of the Naperian logarithms, and $j$ is $\sqrt{-1}$. Substitution in (1) and (2) of all $i$'s and $v$'s by their expressions in terms of $i_n$ and $v_n$, multiplication of (1) and (2), member by member, and division by $i_n v_n$, gives;

$$2(1-\cos\varphi) = \omega^2 LC(1 + 2\alpha_1 \cos\varphi + 2\alpha \cos 2\varphi + \ldots) \qquad (4)$$

The sought condition of no attenuation below cut-off and no phase distortion may be expressed by stating that $\varphi$ is real and proportional to $\omega$; therefore, $$K\varphi^2 = \omega^2 LC \qquad (5)$$

where K designates a constant, the value of which remains to be determined.

Dividing (4) by (5), member by member, gives the expression:

$$\frac{2(1-\cos\varphi)}{2}=1+2\alpha_1\cos\varphi+2\alpha_2\cos 2\alpha+\ldots \quad (6)$$

Equation 6 will be assumed to be satisfied between the limits $\varphi=0$ and $\varphi=\pi$, and its second member will be considered as the Fourier's expansion of the first member between these limits. With this assumption in mind, it can be shown that K and the $\alpha$'s can be expressed in terms of the following two definite integrals:

$$K=\frac{2}{\pi}\int_0^\pi \frac{1-\cos\varphi}{2}d\alpha \quad (7)$$

$$\alpha_n=\frac{2}{\pi K}\int_0^\pi \frac{1-\cos\varphi}{2}\cos n\varphi d\varphi \quad (8)$$

The values of K and of the first six $\alpha$'s have been calculated to five decimal places, and are:

$$\begin{aligned} K&=\ .77270 \quad (9\text{—}1)\\ \alpha_1&=+.16690 \quad (9\text{—}2)\\ \alpha_2&=-.02864 \quad (9\text{—}3)\\ \alpha_3&=+.01218 \quad (9\text{—}4)\\ \alpha_4&=-.00676 \quad (9\text{—}5)\\ \alpha_5&=+.00430 \quad (9\text{—}6)\\ \alpha_6&=-.00297 \quad (9\text{—}7)\end{aligned} \quad (9)$$

For higher values of $n$, the following approximate formula gives values $\alpha_n$ which are correct to five decimal places:

$$\alpha_n=(-1)^{n+1}\left(\frac{.10615}{n^2}+\frac{.030}{n^4}\right) \quad (10)$$

*Application of the basic theory of a delay line*

From (9) and (10) it follows that the successive odd order mutual inductances of an ideal delay line should be aiding, while the even order mutual inductances should be opposing. This is obviously not realized when the coils are axially mounted and regularly spaced, for if the connections are so made that the mutual inductance between adjacent coils is aiding, as it should be, all mutual inductances will be aiding. Therefore, it will be necessary to correct the actual mutual inductances by means of auxiliary coils designed to provide mutual inductances as per Equations 9—2, 9—3, etc.

Figure 2:
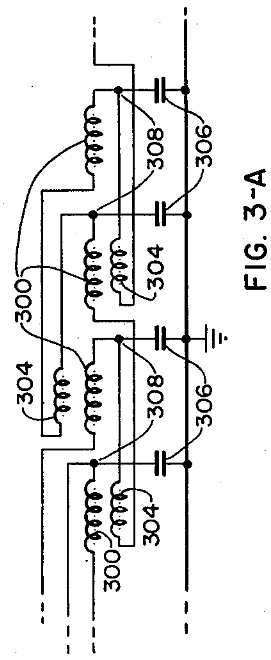
Figure 2 illustrates three curves demonstrating the variations of mutual inductance between three types of coils when the spacing between the coils is varied.
Figure 2:
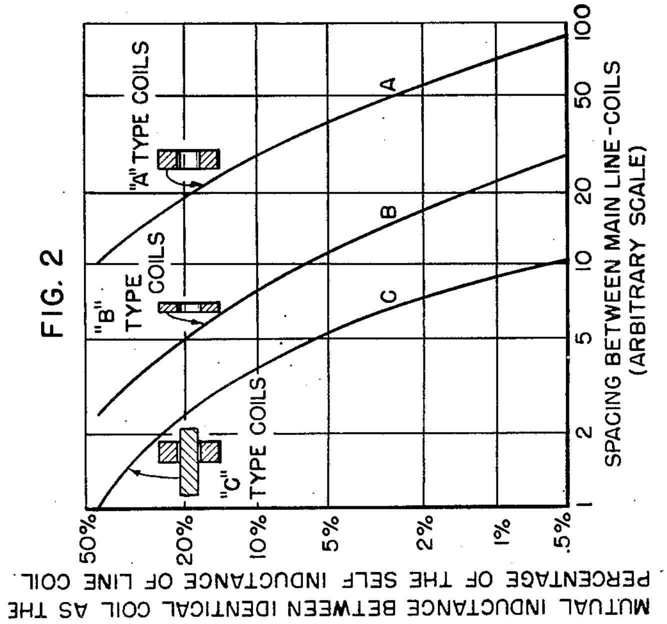

In order to enable one to acquire a more than qualitative conception of the parameters involved, Figure 2 has been drawn to illustrate three graphs of the mutual inductance I have measured between two coaxially mounted coils as a function of spacing between the coil centers for three different types of coil construction so that, whenever the coils of one of these types have been coaxially spaced for a predetermined mutual inductance between the adjacent coils, all other mutual inductances between the reference coil and the remotely-mounted coils are thereby determined. These three types of construction are: air-core coils of the approximate shape illustrated in connection with curves A and B of Figure 2, and magnetic core coils of the approximate shape illustrated in connection with curve C of Figure 2. These graphs, as stated above, may also be used for deriving the mutual inductances between the coils other than the adjacent coils, once the mutual inductance between the adjacent coils, derived from Equation 9—2, has determined the spacing between the adjacent coils. This will be demonstrated in connection with Figure 3.

Figures 3 and 3*a* illustrate a corrected line in which the main coils 300 of A type, Figure 2, are mounted on a non-magnetic coil-mandrel 302 so that the main coils are of air core type, and the corrective elements represent small inductance coils 304 inductively coupled to the preceding main coils in the manner illustrated in the figures, i. e., the corrective coils are superimposed over the outer peripheries of the main coils. Condensers 306 are connected to the junction points 308 so that the corrective components due to the coils 304 are introduced to the proper main coils. The preferred mounting of the main and corrective coils, in which the corrective coils are wound directly on top of the main coils, produces a more effective corrective reactance than when the corrective coils are mounted directly on core 302 and adjacent to or between the main coils, so as to produce side-coupling between the main and the corrective coils. The mutual inductance between the adjacent main coils 300 has been adjusted by properly spacing them from each other in accordance with Equation 9—2, and the mutual inductance between the alternate sections has been corrected in accordance with Equation 9—3 by means of the corrective coils 304 designed to introduce 6.6% mutual opposing inductance between the alternate sections. Thus, if it is assumed that the mutual aiding inductance, which exists between the alternate main coils is 3.7% of L, which figure is derived from curve A on the assumption that the mutual aiding inductance between adjacent main coils is —.167L as per (9—2), the resulting mutual inductance between alternate sections will be the difference between 6.6% and 3.7% or 2.9%, and will be opposing, as per (9—3). This corrected line will have better overall frequency phase characteristics between zero frequency and cut-off frequency than the corrected line in which the mutual inductance between adjacent sections had been adjusted as per (9—2). While the numerical values derived from (9—2) and (9—3) for the adjustments just described can be used to effect this overall improvement, other numerical values calculated to give an even greater improvement at some portion of the frequency band involved, such as for instance the lower portion of the band, can be determined, and a still greater improvement achieved in this particular frequency region; it should be noted, however, that such improvement will be obtained to some extent at the expense of the linearity of the overall characteristics in the entire band. I, therefore, do not wish to restrict myself to specific design values for the mutual inductances, but wish to claim that the introduction of proper corrective inductance between alternate sections can always help to obtain more linear frequency phase characteristics than when this corrective device is not used. I furthermore do not wish to restrict the application of the foregoing theory to a line construction in which the mutual inductances between the adjacent and the alternate sections only is properly adjusted, but wish to extend this claim to any construction in which any number of corrective mutual inductances is utilized. The extension of this principle is illustrated in Figures 4 and 4–A where the number of the corrective coils has been increased to two corrective coils for each main coil 401, 402, 403, 404, or 405. Practical difficulties obviously interfere with an idealized ad infinitum extension and application of the corrective elements.

Referring to Figures 4 and 4A, the uncorrected portion of the relay line per se again consists of air core line coils 401 through 405 of "A" type indicated in Figure 2, which are mounted on a nonmagnetic tube 400, the line coils being equidistantly spaced along a common longitudinal axis provided by tube 400. The junction points 411 through 415 are connected to ground through shunt condensers 406 through 410 respectively, which complete the elements of the uncorrected position of the line. The corrective elements for each section of the line are introduced in this case by means of two auxiliary coils per each section of the line, such as coils 416 and 417, coil 416 being inductively coupled to the main coil 403, while coil 417 is inductively coupled to the main coil 401. The corrective coil 416 is thus coupled to the main coil 403 preceding the main coil 404, and coil 417 is coupled to the main coil 401 third preceding, main coil 404. The specified (see Figs. 4, 4–A) mutual inductance between the adjacent sections is aiding and equal to −.167L, as follows from Equation 9—2, where L is the inductance of any one of the main coils 401 through 405. It is obtained by adjusting the spacings between the adjacent main line coils. By connecting the main coils and the condensers in the indicated manner, and by so dimensioning and spacing the first and second auxiliary coils 416 and 417 respectively an additional opposing mutual inductance is introduced by the auxiliary coil 416 between the alternate sections equal to .066L, and an additional opposing mutual inductance, equal to .012L is also introduced by the auxiliary coil 417 between the main coils that are separated by three main coils; for instance, main coils 401 and 405. Since the spacing between the adjacent main coils is such as to make the mutual inductance between adjacent main coils −.167L, the mutual inductance between the alternate and the more distant main coils without the auxiliary coils will be respectively −.037L, −.013L and −.005L (see curve A, Fig. 2) and the resulting mutual inductances between the alternate and the more distant sections with the auxiliary coils will be respectively in the order of −.167L, +.029L, −.013L and +.007L these values comparing well with the values given by Equations 9—2, 9—3, 9—4, and 9—5, respectively. It will be noted in this connection that Equation 9—4 happens to be approximately satisfied without external correction, which explains the reason for using only two corrective coils per section. As mentioned previously in connection with the description of Figs. 3 and 3–A, the number of the corrective coils per section may be increased, but the law of diminishing returns will govern such multiplication of the corrective elements.

*Extended basic theory of dispersionless delay lines*

In the corrected constructions of the delay lines disclosed thus far the corrective parameters have been introduced by additional mutual inductances inserted between the various sections. I have found it practical and more advantageous to substitute the corrective parameters by corrective capacitances connected across the various junction points. This construction presents the advantage of eliminating the capacities between the various main coils and corrective coils, of providing a less tangled wiring, and eliminating laborious measuring and adjusting of self-inductances of the coils and mutual inductances between the main coils and the corrective coils.

The equations for the capacitively-corrected line will be derived with the aid of Fig. 5. The inductance coils 500 through 503 are grounded through condensers 504—508 respectively, thus forming a conventional ladder type three-terminal network. The corrective capacitive reactances consist of three condensers for each section of the line, such as condensers 509, 510 and 511 for the section formed by coil 503 and condenser 508; condenser 509 being connected across coil 503, condenser 510 across coils 503 and 502, while condenser 511 is connected across coils 503, 502 and 501.

The equations given below are derived by considering the effect of the corrective capacitances connected across the various junction points on the propagation characteristic of a delay line. In this calculation, the actual mutual inductances between adjacent, alternate, etc. coils will be designated by $-a_1L$, $-a_2L$, etc., where the *a*'s will be positive quantities when the mutual inductances are aiding. Similarly, the capacities between adjacent, alternate, etc., junction points will be designated by $b_1C$, $b_2C$, etc. (see Fig. 5). The equations obtained from the application of Kirchhoff's law to this new arrangement become (formerly Equations 1 and 2):

$$i_n-i_{n+1}=j\omega C[v_n+b_1(2v_n-v_{n-1}-v_{n+1})+b_2(2v_n-v_{n-2}-v_{n+2})+\ldots] \quad (11)$$

$$v_n-v_{n+1}=j\omega L[i_{n+1}+a_1(i_n+i_{n+2})+a_2(i_{n-1}+i_{n+3})+\ldots] \quad (12)$$

Former Equation 3 is applicable, and the substitution in (11) and (12) of all the *i*'s and *v*'s by their expressions in terms of $i_n$ and $v_n$, multiplication of (11) and (12) member by member, and division by $i_n$ and $v_n$, gives:

$$2(1-\cos\varphi)=\omega^2LC(1+2a_1\cos\varphi+2a_2\cos 2\varphi+\ldots)[1+2b_1(1-\cos\varphi)+2b_2(1-\cos 2\varphi)+\ldots] \quad (13)$$

The requirement of no attenuation below cutoff and of no phase distortion is satisfied when:

$$K_1\varphi^2=\omega^2LC \quad (14)$$

which, in combination with (13), gives the expression:

$$\frac{2(1-\cos\varphi)}{K_1\varphi^2}=(1+2a_1\cos\varphi+2a_2\cos 2\varphi+\ldots)[1+2b_1(1-\cos\varphi)+2b_2(1-\cos 2\varphi)+\ldots]=[1+2(b_1+b_2+\ldots-a_1b_1-a_2b_2-\ldots)]+2\cos\varphi[a_1(1+2b_1+2b_2+\ldots)-b_1-a_1b_2-a_2b_1-a_2b_3-a_3b_2+\ldots]+2\cos 2\varphi[a_2(1+2b_1+2b_2+\ldots)-b_2-a_1b_1-a_1b_3-a_3b_1-a_2b_4-a_4b_2+\ldots]+\ldots \quad (15)$$

Since $K_1$ can have any fixed value, the comparison of (6) and (15) indicates that the necessary and sufficient condition for linear phase shift is that the successive brackets in the third member of (15) *be proportional to* 1, $a_1$; $a_2$, etc.

The *b*'s can be chosen at will, but little choice is available for the *a*'s when the practical coaxial construction is adopted, in which the mutual inductance between the adjacent coils determines, substantially, all others. If the fuller air core coils are used, and the spacing is adjusted for 18% of mutual inductance between adjacent sections (curve A of Fig. 2), the mutual inductances between the second, third, etc., sections are respectively 4.0%, 1.4%, .6%, .3%, etc. (curve "A") which gives the *a*'s. If capacitance between the alternate junction points only is used, and chosen so that $b_2=8\%$, and all other $b$'s vanish, it can be verified that the successive brackets of the last member of Equation 15 are proportional to: 1, .168, —.029, .002, .003, .002, etc., and can be compared with the required values for the $\alpha$'s: 1, .167, —.029, .012, —.007, .004, etc.

Fig. 6 illustrates a multisection delay line construction in which the air core coils 600 are spaced for 18% mutual aiding inductance between adjacent coils, and in which the corrective capacitances 602, equal to 8% of the capacity of grounded condensers 604, have been inserted between alternate junction points.

If flatter coils are used, the slightly higher mutual inductances between far sections would give larger negative values for the 4th and 5th brackets of Equation 15, thereby improving the agreement of the 4th bracket with the theoretical value. The agreement of the 5th bracket would be slightly worsened, but this can be corrected with a little added capacitance between every 4th junction point, so as to yield a value for $b_4$ which will improve the agreement of the 5th bracket with the required value. Thus if the coils are spaced for 18.2% mutual inductance between adjacent sections, the other mutual inductances derived from curve B of Fig. 2 will be 5.2%, 2.1%, 1.05%, .6%, .14%, etc. Assuming now for $b_2$ and $b_4$ the values of 9.6% and 1.6% respectively, the successive brackets of the last member of Equation 15 will be proportional to: 1, .167, —.028, .004, —.007, .002, etc., thereby giving an appreciably better agreement with the theoretical values than the figures obtained for compact coils with corrective capacitances between the alternate junctions only. Such an arrangement is of especial value in radio frequency delay lines of many sections, for at such frequencies flat coils present the advantage of low distributed capacity.

Fig. 7 illustrates a multisection delay line construction in which the main coils 700 are spaced for 18.2% mutual inductance between adjacent sections, and in which a corrective capacitance 702, having a value of .096C, where C is the capacitance of any grounded condenser 704 is inserted between all alternate junctions, and a capacitance 706, having a value of .016C, is inserted between every fourth junction point of the line.

Curve C of Fig. 2 is a graph of the mutual inductance versus spacing of compact coils having a common iron core, and Fig. 8 illustrates a multisection delay line in which similar coils 800 are also mounted on a common iron core and are so spaced as to give 18% mutual inductance between adjacent sections. The corrective component is introduced by a capacitance 802 equal to 8% of the capacitance to ground 804; it is inserted between alternate junctions. The advantage of the construction illustrated by Fig. 8 is that the proper choice of iron core will give higher inductances and higher Q's than a construction having the same general dimensions, number of turns of coils, etc., but embodying an air core only. Conversely, the use of a suitable iron core permits reduction of the size of the delay line without sacrificing any of its propagation characteristics.

Fig. 9 illustrates another schematic diagram of a multisection delay line similar to the delay line illustrated in Fig. 8 except that, in addition to the corrective capacitances 902 similar to capacitances 602 of Fig. 6, a small corrective condenser

900 equal to 1.4% of the capacitance of condenser 902, is inserted between every fourth junction point of the main line in order to satisfy more closely Equations 9—4, thus approximating more closely the theoretical distortionless line. This permits the use of longer delay lines without any increase in signal distortion.

Actual measurements have indicated that if the coils are flanked with discs of ferromagnetic material, in addition to the central magnetic core, the successive mutual inductances will decrease even less rapidly than in the case of flat air core coils, thereby offering the possibility of even better phase characteristics when suitable capacitances are introduced as corrective factors. However, this case cannot be represented rigorously by a single curve because variations in spacings between the coils produces corresponding changes in their magnetic circuits.

Fig. 10 illustrates a multisection delay line in which the coils 1000 are coaxially mounted on a common ferromagnetic core 1002, are partially shielded from each other by means of ferromagnetic shields 1004, and are so spaced that the mutual inductance between adjacent coils is 18% of their self-inductance; the corrective components are introduced by means of condensers 1006, each having a capacitance equal to 8% of the capacitance of grounded condenser C; one set of condensers 1006 is inserted between one set of alternate junctions of the line, while the other set of corrective condensers 1008 is inserted between the remaining alternate junctions. The advantage of utilizing magnetic discs between the coils consists in enhancing the advantages offered by the iron core type of construction over the air core type.

Fig. 11 illustrates a multisection delay line in which the coils 1100 are coaxially mounted on a common ferromagnetic core 1102 and are partially magnetically shielded from each other by ferromagnetic shields 1104 and are so spaced and connected that their mutual inductance is aiding and is equal to 18.2% of the self-inductance of the coils 1100. The main line condenser 1106 is connected to ground in conventional manner, and the corrective parameters are introduced by means of four sets of condensers: condensers 1108 each having a capacitance equal to 9.6% of the capacitance of condenser 1106 are inserted between one set of alternate junctions, condensers 1109 are inserted between the remaining alternate junctions, and each junction is also connected to the respective fourth preceding junction through condensers 1110 whose capacities are equal to .016C. This type of construction combines the advantages offered by a more complete phase-correction and a more generous use of magnetic material.

While the actual values given above have been calculated so as to produce a practical approach to an ideal delay line, considering the finite number of parameters chosen for the phase corrections, I do not wish to restrict the application of the foregoing theory to the delay lines in which the parameters have the exact values given. Thus, for instance, while the values given will provide delay lines which have nearly optimum overall phase characteristics from zero frequency to the cut-off frequency, when the finite number of the available parameters is considered, slightly different values could also be chosen so as to improve, for instance, the phase characteristics in the lower half of the frequency band involved even more than with the values given above; however, as mentioned previously, such improvement will be somewhat at the expense of the linearity of the upper or remaining portion of the frequency band.

It may be presumed that by placing the main line coils closer together and thus increasing the mutual inductance between the adjacent coils beyond 18% of L, with the concomitant increase in the more remote mutual inductances, a better agreement may be obtained between the fourth term of Equation 15 and the actual, measured mutual inductance corresponding to this term; however, actual computations indicate that the resulting undesirable increases in the first and second cross terms $a_1b_2$, and $a_2b_1$ more than offset the benefit derived from the desired increase in the third term $a_3$.

The general advantages of the described phase-corrected delay lines reside in that signals propagated along such lines are not nearly so distorted as they pass from section to section, as they would be in an uncorrected or less completely corrected delay line.

*Theory of dispersionless reflecting termination of a phase corrected delay line*

In the preceding chapter of the specification, the methods for obtaining a corrected delay line with substantially linear phase characteristics have been discussed. To obtain proper operation of these lines they must be properly terminated. The termination of a delay line will depend upon whether the particular application of a delay line demands that the signals propagated along this line be either reflected in phase, or reflected 180° out of phase, or again be dissipated at the end of the line with negligible reflection.

In order to obtain the values for the line-terminating impedance producing a signal reflection without any change in phase, it will be useful to consider that this delay line is connected to an imaginary delay line which is the image of the real delay line about some point of symmetry of the latter. There are two such possible points of symmetry, namely, one which is obtained by substituting one of the main grounded line condensers, $C_1$ with smaller grounded condensers each of $$\frac{C}{2}$$

value with the line of symmetry passing through the electrical center of these smaller condensers, while the other point of symmetry may be taken as the electrical center of one of the line coils.

Figure 12:
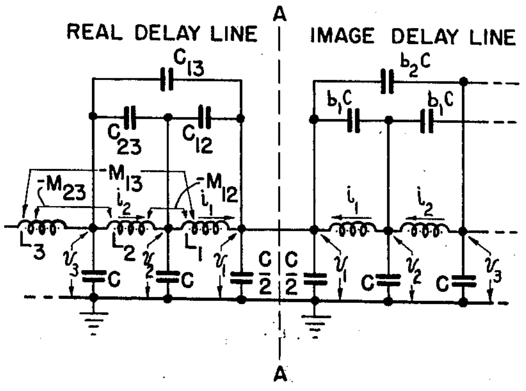

Fig. 12 illustrates schematically, a delay line and its image symmetrically arranged with respect to the first mentioned point of symmetry, the line of symmetry being indicated by line A—A in the figure. In order to obtain the termination of this line which will give a reflection without change of phase, it will be assumed that the image line carries currents equal to the currents in the corresponding portions of the real line, but travelling in the opposite direction, and that the voltages at the various points of the image line are equal in magnitude and sign to the voltages present at the corresponding points of the real line. In the calculations which are to follow, the coils and other elements of the line are numbered in the reverse order with $L_1$ being the last coil at the end of the lines $L_1$, $L_2$, $L_3$, etc. represent respectively the values of the self inductances in the last or, with the reverse order of numbering, in the first, second, third, etc., coils. Also, $-M_{12}$, $-M_{13}$, etc., represent respectively the mutual inductance between the first and second coils, the first and third coils, etc; $M_{23}$ represents the mutual inductance between the second and the third coil, etc., $C_{12}$ represents the corrective capacitance connected across the first coil or across the first and second junction points, $C_{13}$ is the corrective capacitance connected across the first and third junction points, etc., $C_{23}$ the capacitance connected between the second and the third junction points, etc. L represents, as before, the self inductance of the coils and C the capacitance to ground, in portions of the delay line which are many sections away from its termination; furthermore, as before, $-a_1L$, $-a_2L$, etc., represent respectively the mutual inductances between adjacent, alternate, etc. coils and $b_1C$, $b_2C$, etc., the corrective capitances inserted between adjacent, alternate, etc., junctions, in the portions of the delay line which are many sections away from its termination. The conditions for reflection without change of phase will be met if the parameters near the end of the line are so adjusted that the voltages induced in the coils and the currents flowing from every junction point into the capacitances tied to the junction points are the same as if the line were not terminated but continued into its image with the image currents and voltages flowing as stated above. Thus, for instance, the voltage induced in the last coil due to self inductance should be increased (or decreased) by the voltage due to the fictionally induced voltage in that coil due to its mutual inductance with its image in the image line. It follows, therefore, that the value of the self inductance of this last coil should be equal to the value of the normal inductance L less the absolute value of mutual inductance between adjacent coils. We may therefore write:

$$L_1=(1-a_1)L \qquad (16)$$

By using a similar line of reasoning, it becomes possible to write similar expressions for $L_2$, $L_3$, etc. Thus:

$$\begin{aligned} L_2&=(1-a_3)L \\ L_3&=(1-a_5)L \end{aligned} \qquad (16\text{-}a)$$

etc. Similarly the mutual inductance between $L_1$ and $L_2$ should include the fictional effect of the inductance between $L_1$ and the second coil of the image line in which the current is, as assumed, equal but of opposite sign to that flowing in $L_2$. This is described as follows:

$$-M_{12}=(a_1-a_2)L \qquad (17)$$

and the identical relation would have been obtained if we had considered the voltage to be induced in $L_2$ due to its inductive coupling to the first coil of the image line. By applying the same reasoning to more remote inductive couplings one may write for the other mutual inductances:

$$\begin{aligned} -M_{13}&=(a_2-a_3)L \\ &\text{etc.} \\ -M_{23}&=(a_1-a_4)L \end{aligned} \qquad (17\text{-}a)$$

etc.

Figure 13:
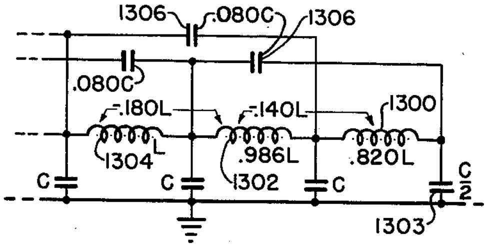

Similarly the capacity connected between the last junction of the line and all the other junctions would be left unchanged. The capacities $C_{12}$, $C_{13}$, etc., would be left unchanged for the images $C_{12}$, $C_{13}$ exist in the image line and none of the connections of these capacitances cross the line about which the delay line is being imaged. On the other hand, the capacitance $C_{23}$ should deliver to the second junction point a current which includes the current which would have been delivered to that junction point by the capacitance $b_3C$ through which it is frictionally connected to the third junction of the image line, at which there is a voltage equal to the voltage at the third junction from the end of the real line. We may, therefore, write:

$$C_{23}=(b_1+b_3)C \quad (18)$$

and the identical relation would have been obtained, had we considered the current which should have been delivered to the third junction from the end of the real line by the capacitance with which it would have been connected to the second junction of the image line. Similar reasoning will give for $C_{24}$, $C_{34}$, etc., the values:

$$C_{24}=(b_2+b_4)C \quad (18\text{–}a)$$

etc. If now the line to be terminated, as discussed above, consists of a line in which, for instance, the mutual inductances $-a_1L$, $-a_2L$, etc., between adjacent, alternate, and more remote coils have the values corresponding to:

$$a_1=.180$$
$$a_2=.040$$
$$a_3=.014$$
$$a_4=.006$$

etc. and in which the phase has been compensated by means of capacitances between every other junction, this corrective capacitance having the value of .08C, so that:

$$b_1=0 \quad (19)$$
$$b_2=.080$$
$$b_3=b_4= \ldots =0$$

we derive from the above considerations that the inductances $L_1$, $L_2$, etc., should have the following values in terms of L:

$$L_1=.820L \quad (20)$$
$$L_2=.986L$$

etc. and the mutual inductances in terms of L are:

$$-M_{12}=.140L \quad (21)$$
$$-M_{13}=.026L$$

etc. while an examination of the values obtained for the various capacitances between the various junctions indicates that these are left unchanged. Since the sign of $a_4$ is opposite to that required for a perfect delay line, and is not compensated by any phase correcting condenser, and since all remaining values of the mutual inductances between more distant sections are small, we may only consider the termination values of the inductive elements which are affected by $a_2$ and $a_3$, which are those actually written above, while all other values of the end parameters can be left unchanged. It will be further observed that the mutual spacing of the last three coils is fully determined by the values of $-M_{12}$ and $-M_{23}$, so that $-M_{13}$ cannot be adjusted exactly to the value given. However, an examination of the curves of Fig. 2 will reveal that the actual value of $-M_{13}$ thus determined by the values of $-M_{12}$ and $-M_{23}$ approximates the desired value fairly closely. A delay line terminated in accordance with the consideration outlined above is illustrated in Fig. 13. The termination per se thus consists of coils 1300 and 1302 having self-inductances equal to .820L and .986L, respectively, mutual inductance $M_{12}$ between 1300 and 1302 equal to −.140L, the last condenser 1303 of value equal to C/2, and the absence of further elements beyond condenser 1303.

Fig. 14 illustrates schematically the delay line termination of the second type in which the point of symmetry of the line and of its image is the electrical center of a coil; as in the first type of termination, the second type of termination gives in phase reflection of line signals. Since the coil representing the electrical center of the line carries two currents of equal magnitude but opposite directions, this coil will be left disenergized and can be left out. The considerations leading to the values of $L_1$, $L_2$, $-M_{12}$, $C_{12}$, etc., in the preceding case are applicable here, and give for the terminal L's and M's:

$$L_1=(1-a_2)L$$
$$L_2=(1-a_4)L$$

etc.

$$-M_{12}=(a_1-a_3)L$$
$$-M_{23}=(a_1-a_5)L$$

etc. (22)

$$-M_{13}=(a_2-a_4)L$$

etc.

$$C_1=C_2= \ldots =C$$
$$C_{12}=(b_1+b_2)C$$
$$C_{23}=(b_1+b_4)C$$

etc.

$$C_{13}=(b_2+b_3)C$$

etc. If, as in the case discussed above, these considerations are applied to the delay line illustrated in Fig. 6, and the effect of the uncorrected mutual inductance to the fourth and more distant coils is neglected, we obtain the following values for the only terminating inductive elements that require revaluation:

$$L_1=.960L$$

and $$-M_{12}=.166L \quad (23)$$

In addition, the condition $$C_{12}=(b_1+b_2)C \quad (24)$$

indicates that the last coil of the line should be shunted by a capacity .08C, while all other capacitances of the line are left unaffected.

Fig. 15 illustrates a schematic diagram of a delay line termination corresponding to the relations just established with the parameters indicated in the drawing; they are .960L for self inductance of the last coil 1500 and −.166L for mutual inductance with the adjacent coil 1502, with .080C for the corrective condenser 1504 shunted across the last order.

Figure 16:
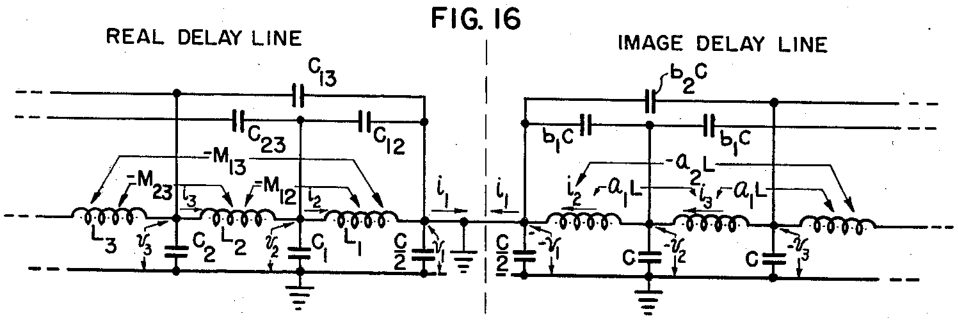

Fig. 16 illustrates a delay line and its image about the electrical center of a condenser; it is utilized to illustrate the derivation of a delay line termination giving a 180° phase reversal. In this case the various currents flowing in the image line will be equal, both in sign and magnitude, to the currents flowing in the corresponding elements of the real line, whereas the voltages present at the various junctions of the image line will be equal but of opposite sign to the voltages present at the corresponding points in the real line. In particular, the end of the last coil of the real line will be at zero potential and therefore may be grounded. It can be verified easily that the same considerations, which were resorted to in the preceding two cases, give for the terminating inductive elements, the following relations:

$$\begin{aligned} L_1 &= (1+a_1)L \\ L_2 &= (1+a_3)L \\ &\text{etc.} \\ -M_{12} &= (a_1+a_2)L \\ -M_{23} &= (a_1+a_4)L \\ -M_{13} &= (a_2+a_3)L \end{aligned} \tag{25}$$

etc. In order to establish the relations from which the values of the capacitative parameters can be calculated, it will be useful to consider the total charge to be delivered by the various capacitances to the various junction points. Thus, for instance, the total charge to be delivered to the penult junction by the various capacitances, real or fictional, connected between this junction point and ground, the other junction points of the real line, and the junction points of the image line, is given by the expression:

$$Q_1 = v_1C + (v_1-v_2)b_1C + (v_1-v_3)b_2C + \ldots + v_1b_1C + 2v_1b_2C + (v_1+v_2)b_3C + (v_1+v_3)b_4C + \ldots \tag{26}$$

The expression above is identical to the expression:

$$-Q_1 = v_1(1+b_1+2b_2+2b_3+ \ldots)C + (v_1-v_2)(b_1-b_3)C + (v_1-v_3)(b_2-b_4)C + \ldots \tag{27}$$

This last relation indicates that the correct amount of current will be delivered to the penult junction if the foregoing conditions are met:

$$\begin{aligned} C_1 &= (1+b_1+2b_2+2b_3+ \ldots)C \\ C_2 &= (1+b_2+2b_3+2b_4+ \ldots)C, \text{ etc.} \\ C_{12} &= (b_1-b_3)C \\ C_{23} &= (b_1-b_5)C, \text{ etc.} \\ C_{13} &= (b_2-b_4)C, \text{ etc.} \end{aligned} \tag{28}$$

Figure 17:
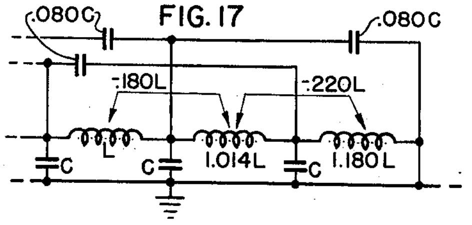

If these relations are applied to the delay line illustrated in Figure 6, and if the mutual inductance from one line to the fourth removed and all further coils are neglected, we derive the delay line termination providing the phase reversal which has been schematically illustrated in Figure 17.

Figure 18 illustrates a delay line and its image about the electrical center of a coil with currents which are symmetrical with respect to the reflecting point and voltages which are asymmetrical. Application of the conclusions derived above will give the following relationships which must be satisfied for obtaining the inphase reflections from the image-line-simulating-termination:

$$\begin{aligned} L_1 &= L \\ L_2 &= (1+a_2)L \\ L_3 &= (1+a_4)L, \text{ etc.} \\ -M_{12} &= 2a_1L \\ -M_{23} &= (a_1+a_3)L, \text{ etc.} \\ -M_{13} &= 2a_2L, \text{ etc.} \\ C_1 &= (1+2b_1+2b_2+ \ldots)C \\ C_2 &= (1+2b_2+2b_3+ \ldots)C, \text{ etc.} \\ C_{12} &= (b_1-b_2)C \\ C_{23} &= (b_1-b_4)C, \text{ etc.} \\ C_{13} &= (b_2-b_3)C, \text{ etc.} \end{aligned} \tag{29}$$

Examination of these relationships indicates that positive values for $C_{12}$, $C_{23}$, etc. are obtainable only when the b's form a monotonically descending series, which is not the case for the phase-corrected lines considered thus far; therefore, no delay line termination based on the case just considered is realizable in practice. The invention thus discloses the following reflecting terminations:

*a.* Termination giving reflection without any change in phase, this type of termination having been obtained by altering the self-inductances and the mutual inductances of the last two coils and by using $$\frac{C}{2}$$

for the capacitance of the last condenser in the case of Fig. 13, and in the second case, Fig. 15, by altering the self-inductance and the mutual inductance of the last coil and by shunting it with a condenser having a capacitance of .080 C;

*b.* Termination giving reflection with 180° phase reversal, which has been obtained by altering the self- and mutual-inductance of the last two coils, as illustrated in Fig. 17.

*Delay line feeding and reflectionless termination*

I have found experimentally that in order to feed the input of a delay line properly from a source of electrical energy, such as the cathode of a vacuum tube, this input may conveniently consist of a direct connection between the cathode and the first coil, the coil being shunted by a capacity ½ C connected to ground through a resistance R where R is given by the formula:

$$R = \sqrt{\frac{L}{C}(1+2a_1+2a_2+ \ldots)} \tag{30}$$

for, with such an arrangement, the line impedance, as viewed from the cathode, will appear to be very nearly resistive in a wide band of frequencies.

Fig. 19 illustrates this method of feeding a delay line. A triode 1900 has its grid connected to a source of line-energizing pulses, and its cathode grounded through the main line coils and a line termination such as that disclosed in Fig. 17; the line is energized through an input terminal impedance including condenser 1902 and a resistance 1904 the values of which have been given above. The input termination of Fig. 19 substantially meets the resistive termination requirement provided the frequency spectrum of the impressed pulse is not especially wide. This method of feeding a delay line is particularly useful when the line is terminated at its far end with a reflectionless termination. However, if the line is terminated at its far end for in- or out-of-phase reflection, added precautions must be taken to provide for impedance matching at the line input, either when the vacuum tube is conducting, or when it is not conducting, depending upon circumstances. Conversely I have also found that a delay line of the general corrected type described in the specification terminated at its end by a capacity of value ½ C shunted by a resistance of the value R given by the expression above will exhibit sufficiently little reflection for most practical purposes. This type of termination is illustrated by Fig. 20. In cases where even less reflection is desired I have found it expedient to extend the delay line by a few sections and to introduce progressive attenuation of the signals in these sections by means of resistances placed in series with the inductances and in parallel with the capacitances of these added sections.

*Calculations of corrected delay lines*

The characteristic impedance Z of a corrected delay line can be calculated from the expression:

$$Z=\sqrt{\frac{L}{C}(1+2a_1+2a_2+\ .\ .\ .\ )} \qquad (31)$$

which, in the case of a line with 18% mutual inductance between adjacent sections, can be reduced to:

$$Z=\sqrt{1.47\frac{L}{C}} \qquad (32)$$

The time delay T per section of a corrected delay line can be calculated from the expression:

$$T=\sqrt{LC(1+2a_1+2a_2+\ .\ .\ .\ )} \qquad (33)$$

which, in the case of the line just considered, can be reduced to the expression:

$$T=\sqrt{1.47LC} \qquad (34)$$

*Exponential delay lines*

In all the foregoing it has been assumed, for the sake of simplifying the disclosure, that the coils and condensers used have infinite Q and zero power factor, respectively. While it is well known that these are ideal properties of the circuit elements which cannot be realized in practice, it is also well known that these ideal properties can be sufficiently closely approached, so as to justify the general conclusions reached above. If, however, the slight dissipation of energy which accompanies its propagation in actual delay line becomes objectionable, which is especially the case if the delay line is long, it is possible to build delay lines which, while exhibiting energy losses as signals are propagated along it, transmit, nevertheless, some parameter of these signals, such as their voltage, or their current (but one without the other) with negligible loss, or amplitude, or waveform variations. For instance, if it is desired to construct a delay line in which voltages are propagated without change from the input of the line to its termination, this can be accomplished by increasing slightly the value of all inductive elements from the input to the termination of the line, while decreasing the value of the corresponding capacitive elements in proportion, so as not to change the time delays for which the line was originally designed. The calculations must be based on the knowledge of the percentage energy lost from one section to the next, or the sought result can be accomplished experimentally with an actually constructed line.

While the invention has been described with reference to several particular embodiments, it will be understood that various modifications of the apparatus shown may be made within the scope of the following claims.

I claim:

1. A phase-corrected delay line of the ladder-type including a plurality of line coils and a plurality of frequency phase-correcting components coupled to said line coils, said components providing, from the junction of each adjacent pair of said coils to adjacent and successively more remote junctions, corrective couplings of successively reversing polarity and decreasing value.

2. A phase-corrected delay line of the ladder-type including a plurality of line coils and a plurality of phase-correcting reactive components coupled to said line coils, said components providing, from the junction of each adjacent pair of said coils to adjacent and successively more remote junctions, corrective couplings of successively reversing polarity and decreasing value.

3. A delay line having similarly recurring reactive elements and including similarly recurring reactive phase correcting components coupled to said reactive elements, said corrective components providing from a junction between adjacent reactive elements to adjacent and successively more remote junctions corrective couplings of successively reversing polarity and decreasing value.

4. A phase-corrected delay line as defined in claim 1 in which the mutual inductances between any selected reference coil and the first, second, third and fourth coils respectively on either side of the selected coil are in the order of −.167L,+.029L,−.012L, and +.007L, where L is the self-inductance of any line coil, and positive and negative signs designate opposing and aiding mutual inductances respectively.

5. A phase-corrected delay line as defined in claim 1 in which the line coils are equidistantly spaced air-core coils spaced along a common longitudinal axis, the mutual inductances between any selected reference coil and the first, second, and third coils respectively on either side of said reference coil are in the order of −.167L,+.029L, where L is the self-inductance of any line coil, and positive and negative signs designate opposing and aiding mutual inductances respectively, the spacing between adjacent coils determining the mutual inductance of −.167L therebetween, and said phase-correcting components having reactance-correcting values of an amount to modify the mutual inductances between the alternate line coils providing a resultant mutual inductance of +.029L therebetween.

6. A delay line comprising a recurrent ladder-type network whose sides includes a plurality of first elements whose parameters approach ideal inductive reactances and whose rungs include a plurality of second elements whose parameters are substantially capacitive reactances, each of said inductive reactances comprising a main self-inductance and a plurality of mutual inductances with respect to the other first elements, and a plurality of corrective reactive components coupled between said first elements providing in combination with the mutual inductance between said first elements resultant inductance between any first element and the remaining first elements aiding as to those elements with an even number, including zero, of first elements therebetween and opposing as to those elements with an odd number of first elements therebetween.

7. A delay line as defined in claim 6 in which said resultant inductances are given by the following definite integral $$-M_n=\frac{2L}{K}\int_0^{\pi}\frac{1-\cos\varphi}{\varphi^2}\cos n\varphi d\varphi$$

where K is defined by the definite integral $$K=\frac{2}{\pi}\int_0^{\pi}\frac{1-\cos\varphi}{\varphi^2}d\varphi$$

and where $-M_n$ is the mutual inductance between any section and the *n*th removed section, the sign of the mutual inductance being positive for an opposing mutual inductance.

8. A delay line comprising a recurrent ladder-type network including serially connected inductive elements each having a self-inductance and mutual inductances to the other inductive elements, capacitive shunt elements, and additional elements modifying the mutual inductances of said inductive elements, said additional elements including corrective reactive components coupled between said serially connected inductive elements providing in combination with the mutual inductance between said serially connected elements resultant inductive reactance of successively reversing polarity and decreasing value between adjacent and successively more remote ones of said serially connected inductive elements for imparting a substantially linear frequency phase characteristic to said line over the operating frequency range of said line.

9. A phase-corrected delay line comprising a recurrent multisection ladder-type network, each section of said line including a main coil connected in series with the main coils of the other sections, an auxiliary coil connected in series with and preceding said main coil, and a condenser connected between ground and the junction between said auxiliary coil and the main coil of the preceding section, said auxiliary coil being inductively coupled to the main coil of the second preceding line-section providing in combination with the mutual inductances between said main coils resultant inductances between said alternate coils opposite in polarity from that between adjacent ones of said main coils.

10. A delay line as defined in claim 9 in which the main coils are coaxially mounted coils and the auxiliary coils are coaxially and concentrically mounted with said main coils.

11. A phase-corrected delay line of the ladder type having a plurality of sections, each including a condenser, a first main line coil, and first and second auxiliary coils forming a series circuit with a line coil of the preceding line-section and with said first line coil, said first auxiliary coil being inductively coupled to the main line coil of the second preceding line section, and said second auxiliary coil being inductively coupled to the main line coil of the fourth preceding line section, one pole of said condenser being connected to the junction between said preceding main line coil and said first auxiliary coil, and the other pole of said condenser being connected to a common conductor interconnecting all other poles of condensers in the remaining sections of said line.

12. A phase-corrected delay line as defined in claim 11 in which said main line coils are equidistantly spaced air-core coils having a common longitudinal axis, said first auxiliary coil being mounted on the outer periphery of the second preceding main coil, and said second auxiliary coil being mounted on the outer periphery of an auxiliary coil mounted on the periphery of the fourth preceding main coil, the spacing between the main coils being such as to make the aiding mutual inductance between adjacent sections in the order of .167L, the construction of the line being such as to make the mutual inductance between the alternate sections opposing and in the order of .029L, and the resultant opposing mutual inductance between any section and the fourth section spaced therefrom in the order of .007L, where L is the self-inductance of any section.

13. A phase-corrected delay line of ladder-type having a plurality of serially connected line coils, and a corresponding plurality of main shunt-condensers each connected between a common conductor and a junction between said coils, and a set of phase-correcting auxiliary condensers connected across every pair of adjacent line coils, each condenser in said set shunting a corresponding single pair of adjacent coils of said line, said auxiliary condensers providing resultant reactances between alternate coils opposite in polarity from the reactances between adjacent coils.

14. A phase-corrected delay line as defined in claim 13 in which the ladder-type construction of said line is composed of equal, recurrent sections and in which said main line coils are equidistantly spaced air-core coils having a common longitudinal axis, the spacing and the connections between the main coils being such as to make the mutual inductance between adjacent coils aiding and in the order of .18L, and the capacitance of each of the said auxiliary condensers being in the order of .08C, where L is the self-inductance of any coil, and C is the capacitance of any one of said main shunt-condensers.

15. A phase-corrected delay line as defined in claim 13 in which the ladder-type construction of said line is composed of equal, recurrent sections and which also includes a common magnetic core for said coils, said coils being equidistantly spaced and mounted on said core, the spacing and the connections between the main coils being such as to make the mutual inductance between adjacent coils aiding and in the order of .18L, and the capacitance of each of said auxiliary condensers being in the order of .08C, where L is the self-inductance of any coil, and C is the capacitance of any one of said main shunt-condensers.

16. A phase-corrected delay line as defined in claim 13 in which the ladder-type construction of said line is composed of equal, recurrent sections and which also includes a common magnetic core for said main line coils, said main line coils being equidistantly spaced and mounted on said core and magnetic shields mounted on said magnetic core, one shield between each pair of adjacent coils, the spacing and the connections between the coils being such as to make the mutual inductance between adjacent coils aiding and in the order of .18L, and the capacitance of each of said auxiliary condensers being in the order of .08C, where L is the self-inductance of any coil, and C is the capacitance of any one of said main shunt-condensers.

17. A phase-corrected delay line of ladder-type having a plurality of serially connected line coils and a corresponding plurality of main shunt-condensers, each connected between a common conductor and a junction between said coils, a first set of auxiliary correcting condensers shunting every pair of said coils, each condenser in said first set shunting a corresponding single pair of adjacent coils of said line, and a second set of auxiliary correcting condensers shunting every group of four adjacent line coils, whereby a single condenser in said second set shunts four adjacent line coils, said auxiliary condensers providing in combination with the mutual inductances between said line coils resultant reactances of successively reversing polarity and decreasing value between adjacent and successively more remote line coils.

18. A phase-corrected delay line as defined in claim 17 in which the ladder-type construction of said line is composed of equal, recurrent sections and in which said line coils are equidistantly spaced air-core coils having a common longitudinal axis, the spacing and the connections between the coils being such as to make the mutual inductance between adjacent coils aiding and in the order of .182L, said auxiliary condensers connected across each pair of adjacent coils having a capacitance in the order of .096C, and said condensers connected across each group of four adjacent coils having a capacitance in the order of .016C, where L is the self-inductance of any coil, and C is the capacitance of any one of said main shunt-condensers.

19. A phase-corrected delay line as defined in claim 17 in which the ladder-type construction of said line is composed of equal, recurrent sections and which also includes a common magnetic core for said main line coils, said line coils being mounted and equidistantly spaced on said core, the spacing and the connections between the coils being such as to make the mutual inductance between adjacent coils aiding and in the order of .182L, said auxiliary condensers connected across each pair of adjacent coils having a capacitance in the order of .096C, and said condensers connected across each group of four adjacent coils having a capacitance in the order of .016C, where L is the self-inductance of any coil, and C is the capacitance of any one of said main shunt-condensers.

20. A phase-corrected delay line as defined in claim 17 in which the ladder-type construction of said line is composed of equal, recurrent sections and which also includes a common magnetic core for said line coils, said line coils being mounted and equidistantly spaced on said core, magnetic shields mounted on said magnetic core, one shield between each adjacent pair of said coils, the spacing and the connections between the main coils being such as to make the mutual inductance between adjacent coils aiding and in the order of .182L, said auxiliary condensers connected across each pair of adjacent coils having a capacitance in the order of .096C, and said condensers connected across each group of four adjacent coils having a capacitance in the order of .016C, where L is the self-inductance of any one of said line coils and C is the capacitance of any one of said main shunt-condensers.

21. A phase-corrected delay line comprising a recurrent, multisection, ladder-type network including a plurality of serially connected line coils, a corresponding plurality of grounded shunt condensers, a plurality of frequency phase-correcting elements coupled to said line coils providing in combination with the mutual inductances between said line coils resultant reactances of successively reversing polarity and decreasing value between adjacent and successively more remote line coils, and a termination of said line, said termination comprising a positive electrical image of said delay line taken about a line of symmetry passing through a junction between two coils whereby all original signals travelling toward said termination are reflected in phase as though the reflected signals had originated in a virtual continuation of said line and had travelled in the direction opposite to the direction of travel of the original signals.

22. A phase-correcting delay line comprising a recurrent, multisection, ladder-type network including a plurality of serially-connected line coils, a corresponding plurality of grounded shunt condensers, a plurality of phase-correcting elements coupled to said line coils providing in combination with the mutual inductances between said line coils resultant reactances of successively reversing polarity and decreasing value between adjacent and successively more remote line coils, and a termination of said line, said termination comprising a positive electrical image of said original line taken along the line of symmetry passing through the electrical center of one of the line coils, whereby said electrical image simulates a virtual continuation of said line so that all original signals travelling toward said termination are reflected in phase as though the reflected signals had originated in said virtual continuation and had originally travelled in the direction opposite to the direction of travel of the original signals.

23. A phase-corrected delay line comprising a recurrent, multisection, ladder-type network including a plurality of serially connected line coils, a corresponding plurality of grounded shunt-condensers, a plurality of phase-correcting elements coupled to said line coils providing in combination with the mutual inductances between said line coils resultant reactances of successively reversing polarity and decreasing value between adjacent and successively more remote line coils, and a termination for said line, said termination comprising a negative electrical image of said delay line with a coil junction taken as point of symmetry whereby said image simulates a virtual continuation of said line so that the signals travelling along said delay line will be reflected 180° out of phase as though they had originated with the opposite sign in said virtual continuation of said delay line.

24. A phase-corrected delay line comprising a recurrent, multisection, ladder-type network including a plurality of serially connected line coils and a corresponding plurality of grounded shunt condensers, a plurality of frequency phase-correcting components coupled to said coils providing in combination with the mutual inductances between said line coils resultant reactances of successively reversing polarity and decreasing value between adjacent and successively more remote line coils, and a termination for said line, said termination including a terminal impedance condenser connected between ground and the outer end of the last coil, the value of said condenser being one-half the capacitance of any one of said shunt condensers, and the self-inductance of said last coil being in the order of .82L, the inductance of the second coil from the end being in the order of .986L, and the mutual inductance between said last two coils being aiding and in the order of .14L, where L is the self-inductance of any one of the unaffected recurrent line coils.

25. A phase-corrected delay line comprising a recurrent, multisection, ladder-type network including a plurality of serially connected line coils and a corresponding plurality of grounded shunt condensers, a plurality of frequency phase-correcting elements coupled to said line coils providing in combination with the mutual inductances between said line coils resultant reactances of successively reversing polarity and decreasing value between adjacent and successively more remote line coils, and a termination of said line, said termination including a modified line section, the line coil of said section having a self-inductance equal to .96L and an aiding mutual inductance with respect to the preceding coil equal to .166L, said last coil being shunted by a condenser having a capacitance of .08C, and a condenser connected between ground and its outer end having a capacitance equal to C, where L is the self-inductance of any one of the unaffected recurrent line coils, and C is the capacitance of any one of said shunt condensers.

26. A phase-corrected delay line comprising a recurrent, multisection, ladder-type network including a plurality of serially connected line coils and a corresponding plurality of grounded shunt condensers, a plurality of frequency phase-corrected condensers coupled to said line coils providing in combination with the mutual inductances between said line coils resultant reactances of successively reversing polarity and decreasing value between adjacent and successively more remote line coils and a termination of said line, said termination comprising two modified sections at the end of said line, said modifications including direct grounding of the outer end of the last coil, the self-inductance of the said last coil being 1.18L and the self-inductance of the penult coil being 1.014L, and the mutual inductance between said last two coils being aiding and equal to .22L, where L is the self-inductance of any one of the unaffected recurrent line coils.

27. A phase-corrected delay line comprising a recurrent, multisection, ladder-type network, including a plurality of serially-connected line coils and grounded shunt condensers, a plurality of phase-correcting components coupled to said line coils providing in combination with the mutual inductances between said line coils resultant reactances of successively reversing polarity and decreasing value between adjacent and successively more remote line coils, and a terminating impedance connected to the last section of said line, said impedance including a parallelly-connected resistance-condenser combination connected between ground and the outer end of the last coil. the value of said resistance being equal to the characteristic impedance of said line, and the value of said condenser being one half the capacitance of any one of said shunt condensers.

28. A phase-corrected delay line comprising a recurrent, multisection, ladder-type network including a plurality of serially-connected line coils and a corresponding plurality of grounded shunt condensers, a plurality of phase-correcting components coupled to said line coils providing in combination with the mutual inductances between said line coils resultant reactances of successively reversing polarity and decreasing value between adjacent and successively more remote line coils, and an input impedance connected across the first section of said line, said input impedance comprising a serially-connected resistance-condenser combination.

29. A phase-corrected delay line comprising a recurrent, multisection, ladder-type network including a plurality of serially-connected line coils and a corresponding plurality of grounded shunt condensers, a plurality of phase-correcting components coupled to said line coils providing in combination with the mutual inductances between said line coils resultant reactances of successively reversing polarity and decreasing value between adjacent and successively more remote line coils and an input impedance connected across the first section of said line, said input impedance comprising a serially-connected resistance-condenser combination, the capacitance of said condenser being equal to .5C, where C is the capacitance of any one of said shunt condensers, and where the value of said resistance is equal to the characteristic impedance of said line.

30. A low pass linear delay line of the ladder type comprising a plurality of line coils having mutual inductance therebetween and corrective reactive components coupled between said line coils providing in combination with said mutual inductances resultant reactances of successively reversing polarity and decreasing value between adjacent and successively more remote line coils.

31. A low pass linear delay line of the ladder type comprising a plurality of coils coupled in series having mutual inductive reactance therebetween and corrective reactive components coupled between said coils providing in combination with said mutual inductive reactances resultant inductive reactances of successively reversing polarity and decreasing value between adjacent and successively more remote coils.

32. A low pass linear delay line of the ladder type comprising a plurality of coils coupled in series having mutual inductive reactance therebetween of the same polarity and corrective reactive components coupled between coils more remote than adjacent ones providing in combination with said mutual inductive reactances resultant inductive reactances of successively reversing polarity and decreasing value between adjacent and successively more remote coils.

33. A low pass linear delay line of the ladder type comprising a plurality of coils coupled in series having aiding mutual inductive reactance therebetween and corrective reactive components coupled between alternate ones of said coils providing in combination with said mutual inductive reactances resultant inductive reactances of opposing polarity between said alternate coils.

34. A delay line according to claim 33 in which said corrective reactive components comprise additional coils providing opposing inductive reactance between alternate ones of said first mentioned coils.

35. A delay line according to claim 33 in which said corrective reactive components comprise condensers coupled between alternate junction points of said coils.

36. A low pass linear delay line of the ladder type comprising a plurality of coils serially connected and having aiding mutual inductance therebetween, said mutual inductance between adjacent coils being of the order of .167L where L is the self-inductance of each of said coils, a grounded conductor, a plurality of condensers of capacitance C each connected between a junction point between said coils and said grounded conductor, and a plurality of corrective reactive components coupled between alternate ones of said coils and providing in combination with said mutual inductances resultant opposing inductive reactances between said alternate coils of the order of .029L.

37. A delay line according to claim 36 in which said corrective reactive components comprise inductive components each coupled in series with one of said coils and inductively coupled to the second coil preceding said one coil.

38. A delay line according to claim 37 in which said corrective reactive components further comprise additional inductive components each coupled in series with one of said first-mentioned inductive components and one of said coils and inductively coupled to the coil fourth preceding said one coil, said additional inductive components providing in combination with said mutual inductances opposing inductive reactances between coils separated from one another by three coils of the order of .007L.

39. A delay line according to claim 36 in which said corrective reactive components comprise capacitive components of the order of .096C, each of said capacitive components being connected in shut across a pair of said coils.

40. A delay line according to claim 39 in which said corrective reactive components further comprise additional capacitive components of the order of .016C, each of said additional capacitive components being connected in shunt across four of said coils, said additional capacitive components providing in combination with said mutual inductances opposing inductive reactances of the order of .007L between coils separated from one another by three coils.

41. A delay line according to claim 36 further comprising an in-phase reflecting termination including a pair of serially connected inductive elements of values respectively of about .986L and .820L connected in series with said coils and having aiding mutual inductance therebetween of about .140L, a capacitive element of value of about C connected between the junction between said inductive elements and said grounded conductor, a capacitive element of value of about .5C connected between said .820L element and said grounded conductor, and a capacitive element of value of about .080C connected in shunt across said inductive elements.

42. A delay line according to claim 36 further comprising an out-of-phase reflecting termination including a pair of series-connected inductive elements of values respectively of about 1.014L and 1.180L connected in series with said coils and having aiding mutual inductance therebetween of about .220L, a capacitive element of value of about C connected between the junction between said inductive elements and said grounded conductor, said 1.180L inductive element being connected on its other side to said grounded conductor, and a capacitive element of value of about .080C connected in shunt across both said inductive elements.

43. A delay line according to claim 36 further comprising input coupling means between said coils and said grounded conductor including a series connection of a capacitive element of value of about .5C and a resistive element of value of about the characteristic resistance of the delay line and a reflectionless termination between said coils and said grounded conductor including a parallel connection of a capacitive element of value of about .5C and a resistive element of value of about the characteristic impedance of the line.

MARCEL J. E. GOLAY.

REFERENCES CITED

The following references are of record in the file of this patent:

UNITED STATES PATENTS

| Number | Name | Date |
|---|---|---|
| 1,958,742 | Caver | May 15, 1934 |
| 2,024,234 | Kunze | Dec. 17, 1935 |
| 2,153,857 | Wheeler | Apr. 11, 1939 |
| 2,199,634 | Koch | May 7, 1940 |
| 2,226,728 | Lalande et al. | Dec. 31, 1940 |
| 2,390,563 | Tawney | Dec. 11, 1945 |